G. WILLIAMSON.
BELT SHIFTER.
APPLICATION FILED NOV. 10, 1910.
1,001,494.
Patented Aug. 22, 1911.
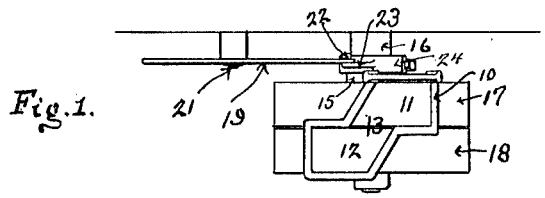
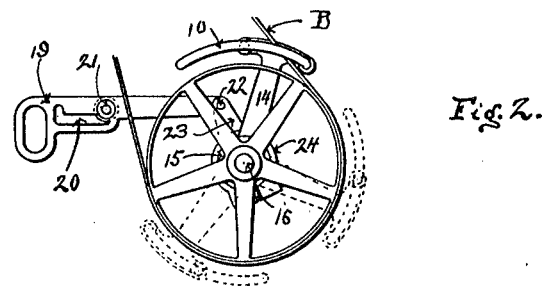
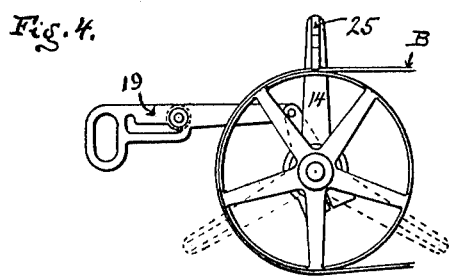 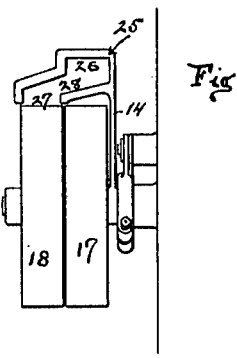
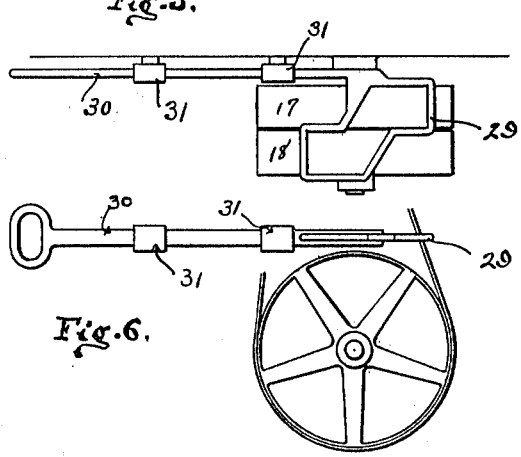
Witnesses:
L. H. Grote
M. E. Keir
Inventor
GEORGE WILLIAMSON
By his Attorneys
Howson and Howson

UNITED STATES PATENT OFFICE.

GEORGE WILLIAMSON, OF MATTEAWAN, NEW YORK.

BELT-SHIFTER.

1,001,494.　　　　Specification of Letters Patent.　　Patented Aug. 22, 1911.

Application filed November 10, 1910. Serial No. 591,626.

*To all whom it may concern:*

Be it known that I, GEORGE WILLIAMSON, a citizen of the United States of America, and residing at Matteawan, in the county of Dutchess and State of New York, have invented a certain new and Improved Belt-Shifter, of which the following is a specification.

My invention relates to belt shifters and the object of my invention is to provide an improved device of this sort which in its preferred form is adjustable with relation to its actuating lever so that it may be arranged upon a belt led to its pulleys from any direction as will be more clearly set forth in the following description.

In the accompanying drawings, Figures 1 and 2 are respectively plan and side elevation of my improved shifter in one form; Figs. 3 and 4 are similar views of the shifter in another form, while Figs. 5 and 6 are similar views of the shifter in a third form.

In its preferred form, Figs. 1 and 2, of my improved belt shifter consists of a guide frame 10 forming two free ways 11 and 12 connected by an inclined runway 13 through which the belt B passes from one free-way to the other. The frame 10 is carried by an arm 14 pivoted by a hub 15 on the axis 16 of the fast and loose pulleys 17 and 18. An operating handle 19, which may be slotted at 20 to receive a stud 21, is pivoted at 22 to the lug 23 on a clamping ring 24, mounted on the hub 15. By securing the handle in this fashion on the hub 15, it is possible to adjust the belt frame 10 on the axis 16 (as indicated in dotted lines) to accommodate the same to the belt from whatever direction the latter may be led to the pulleys, while at the same time maintaining the handle 19 in the most convenient position for the operator. It is obvious that upon rotating the frame 10, the edge of the belt B is brought into engagement with one side or the other of the runway 13, and thus guided from one freeway to the other.

The modification of the structure shown in Figs. 3 and 4 relates only to the form of the frame 25 which instead of being formed in a curve of larger radius than the belt pulleys, lies in a plane radial to the axis 16 with the freeways 26 and 27 at different radial distances from the axis and connected by an inclined runway 28 lying in said plane. Obviously the shifting action is substantially the same, since upon the rotation of the frame the belt engages one side or the other of the runway 28 and is thereby shifted from one freeway to the other.

When adjustment of the position of the frame with relation to the handle is not a desideratum, the form shown in Figs. 5 and 6 may be employed. Here the frame 29 is made rigid with the operating handle 30 and is carried by the brackets 31 rigidly fixed on the side of a machine or other support. The shifter lies in a plane parallel to the axis of the belt wheels and is shifted in this plane by sliding the handle through brackets 31. The action of the shifter is readily understood from the explanation of the forms previously described. It will be noted also that in every form, the side members of the frame serve as guards which not only prevent the belt from escaping from either wheel, but also maintain it accurately positioned on the one to which it has been shifted.

Various modifications of the structure shown will readily suggest themselves which do not depart from my invention, and I do not limit myself to the use of only two freeways or to the location of the shifter directly over the pulleys, or to various other details mentioned in the description.

I claim as my invention:—

1. A belt shifter with a plurality of freeways spaced apart for the purpose specified, in combination with an inclined runway connecting said freeways and adapted, upon the actuation of the shifter, to engage one side or the other of a belt and shift it from one freeway to the other.

2. A belt shifter with a plurality of freeways spaced apart for the purpose specified, in combination with an inclined runway connecting said freeways and adapted, upon the actuation of the shifter, to engage one side or the other of a belt and shift it from one freeway to the other, together with means for mounting said shifter upon the axis of the belt pulley.

3. A belt shifter with a plurality of freeways spaced apart for the purpose specified, in combination with an inclined runway connecting said freeways and adapted, upon the actuation of the shifter, to engage one side or the other of a belt and shift it from one freeway to the other, together with means for mounting said shifter upon the axis of the belt pulley, and an actuating handle angularly adjustable with relation to said frame mounting for the purpose described.

4. A belt shifter curved on a radius greater than that of the belt pulleys over which it is mounted and provided with a plurality of freeways spaced apart for the purpose specified, in combination with an inclined runway connecting said freeways and adapted, upon the actuation of the shifter, to engage one side or the other of a belt and shift it from one freeway to the other.

5. A belt shifter comprising a shifting frame for a continuously running belt, an arm carrying said frame, and means for pivotally mounting said arm on the belt pulley axis, in combination with an operating handle adjustably engaging said arm to rock the same on the said axis and means in connection with the rocking of said frame for shifting a belt laterally without interrupting its running, substantially as described.

In testimony whereof I have signed my name to this specification, in the presence of two subscribing witnesses.

GEORGE WILLIAMSON.

Witnesses:
 DAVID J. HANNA,
 J. M. GANTVOORT.

---

Copies of this patent may be obtained for five cents each, by addressing the "Commissioner of Patents, Washington, D. C."